United States Patent [19]

Korall et al.

[11] Patent Number: 5,515,939
[45] Date of Patent: May 14, 1996

[54] METAL-AIR BATTERY-POWERED ELECTRIC VEHICLE

[75] Inventors: Menachem Korall; Boris Dechovitch; Jonathan R. Goldstein, all of Jerusalem, Israel

[73] Assignee: Electric Fuel (E.F.L.) Ltd., Jerusalem, Israel

[21] Appl. No.: 350,548

[22] Filed: Dec. 7, 1994

[30] Foreign Application Priority Data

Dec. 7, 1993 [IL] Israel ............................ 107930

[51] Int. Cl.$^6$ ................................ B60K 28/00
[52] U.S. Cl. ................................ 180/283; 180/284
[58] Field of Search ........................ 180/282, 283, 180/284

[56] References Cited

U.S. PATENT DOCUMENTS

| | | | |
|---|---|---|---|
| 3,198,899 | 8/1965 | Hitchcock | 180/283 |
| 3,416,625 | 12/1968 | Narutani | 180/214 |
| 3,743,849 | 7/1973 | Iwata | 307/10.1 |
| 4,020,453 | 4/1977 | Spies et al. | 280/735 |
| 4,195,897 | 4/1980 | Plevjak | 180/283 |
| 4,904,547 | 2/1990 | Mizumoto et al. | 429/22 |
| 4,913,983 | 4/1990 | Cheiky | 429/13 |
| 5,238,083 | 8/1993 | Horie et al. | 180/274 |
| 5,327,990 | 7/1994 | Busquets | 180/271 |
| 5,354,625 | 10/1994 | Bentz et al. | 429/17 |

FOREIGN PATENT DOCUMENTS

| | | | |
|---|---|---|---|
| 2580856 | 10/1986 | France | 180/283 |
| 2902439 | 7/1980 | Germany | 180/283 |
| 3417328 | 11/1985 | Germany | 180/283 |
| 4305819 | 9/1993 | Germany . | |
| 92/06514 | 4/1992 | WIPO . | |

*Primary Examiner*—Kenneth R. Rice
*Attorney, Agent, or Firm*—Helfgott & Karas

[57] ABSTRACT

The invention provides a metal-air battery-powered electric vehicle of the type having a motor powered by a plurality of metal-air cells wherein air is continuously provided to the cells by a blower system energized from a power source, in combination with a collision-activated switch for disconnecting the air blower system from the power source, wherein upon activation of the switch the air in the cell is immediately depleted and the battery is rendered substantially inert in less than 5 seconds.

10 Claims, 1 Drawing Sheet

METAL-AIR BATTERY-POWERED ELECTRIC VEHICLE

BACKGROUND OF THE INVENTION

The present invention relates to a metal-air battery-powered electric vehicle.

More particularly, the present invention relates to such a vehicle having a collision safety device incorporated therein.

Various proposals have been made in the past for electric-powered vehicles. To date, for a number of reasons, electric vehicle systems have yet to become commercially viable for urban and highway applications. There have been proposals to employ zinc-air batteries for urban vehicle propulsion. An example is the publication "Improved Slurry Zinc-Air Systems as Batteries for Urban Vehicle Propulsion," by P. C. Foller, *Journal of Applied Electrochemistry*, Vol. 16, pp. 527–543 (1986).

Metal-air battery structures are described in the following publications: U.S. Pat. No. 4,842,962, entitled "Zinc Electrode and Rechargeable Zinc-Air Battery;" U.S. Pat. No. 4,147,839, entitled "Electrochemical Cell with Stirred Slurry;" U.S. Pat. No. 4,908,281, entitled "Metal-Air Battery with Recirculating Electrolyte;" U.S. Pat. No. 3,847,671, entitled "Hydraulically-Refuelable Metal-Gas Depolarized Battery System;" U.S. Pat. No. 4,925,744, entitled "Primary Aluminum-Air Battery;" U.S. Pat. No. 3,716,413, entitled "Rechargeable Electrochemical Power Supply;" U.S. Pat. No. 4,925,744, entitled "Primary Aluminum-Air Battery."

One of the characteristics of metal-air batteries such as zinc-air is that, unlike conventional batteries such as lead-acid and nickel cadmium, in which both the anodic and cathodic active materials must be stored within the plates of the cell, in metal-air only the anodic active material (the zinc in the case of zinc-air) is stored within the system. The cathodic reactant (oxygen from the air) is supplied from outside the battery from the surrounding air, either by natural diffusion in the case of small size, low power, single-cell units, or by forced flow (from, for example, a fan or blower) in the case of large size, high power, multi-cell assemblies. A typical example of the former category is a zinc-air button cell for a hearing aid, relying only on natural diffusion of air, and able to supply a current density only in the range of 1–10 mA/cm$^2$. A typical example of the latter category is a zinc-air electric vehicle battery, comprising close stacking of perhaps as many as 400 cells, requiring an air blower, but capable of supplying continuous current density of the order of 100 mA/cm$^2$ and peak current densities of 400 mA/cm$^2$.

Particularly for the latter application, high power batteries for electric vehicles, an important consideration is the system safety under accident conditions (e.g., collision). Simple electrical disconnection of the load (i.e., the electric vehicle motor) from the battery in the case of a collision is certainly advantageous, since the battery and motor are returned to a non-active state, now being isolated and inoperative. A problem can arise, however, if component cells of the battery are damaged, for example, if battery plates with opposite polarity are distorted by the collision and touch, forming a short circuit. Isolating the battery from the motor will not help here, since individual cells or groups of cells could still provide high levels of local current and local heating, perhaps involving the risk of fire. This is especially the case with batteries of the conventional kind, wherein plates of opposite polarity are carriers of their own respective active material masses, and individual shorts could still continue damage scenarios after the collision. Even in the case of a metal-air battery such as zinc-air, where only the zinc anode material is carried within the battery, as long as the air supply is continued to the cells, subsequent damage can be sustained in individual shorted cells or groups of cells.

In U.S. Pat. Nos. 3,743,849 and 5,327,990, there are disclosed apparatus for automatically disconnecting the power circuit for vehicles during impact and which also shut off the fuel supply to the motor; however, said patents are addressed to the inactivating of internal combustion engines and do not teach or suggest an appropriate solution for electric vehicles.

In U.S. Pat. No. 5,238,083 this problem is dealt with in electric vehicles by providing an impact sensor connected to a controller for changing the battery units from a connected state to a state separated into a plurality of groups.

This solution is impractical, however, for electric batteries now proposed for electric vehicles, wherein the battery is composed of several hundred interconnected cells.

SUMMARY OF THE INVENTION

With the above-described background in mind, it has now been found, according to the present invention, that improved safety is achieved for zinc-air electric vehicle batteries by cutting the air supply to the battery stack in the case of a collision (i.e., stopping the air fan or blower of the battery). In such a case, when air (oxygen) is no longer supplied to the stack, the close-packed air electrodes become exhausted of oxygen within a matter of seconds, and the current-generating capability of the cells falls from hundreds of mA/cm$^2$ down to a few mA/cm$^2$, a level which is not capable of sustaining local short/heating damage in case of short-out of zinc anodes and air cathodes.

Thus, according to the present invention there is provided, in a metal-air battery-powered electric vehicle of the type having a motor powered by a plurality of metal-air cells wherein air is continuously provided to said cells by a blower system energized from a power source, a collision-activated switch for disconnecting said blower system from said power source, wherein upon activation of said switch the air in said cell is immediately depleted and said battery is rendered substantially inert in less than 5 seconds.

In U.S. Pat. 4,904,547 there is described and claimed a fuel cell device with switch-over valves which open at the time of urgent stop of the device and which are based on differential pressure detectors. However, said patent is based on the flooding of a stationary pressurized fuel cell with nitrogen upon detection of excess fuel or air pressure and does not teach or suggest the use of a collision-activated switch to disconnect an air blower in the non-pressurized metal-air battery-powered vehicle of the present invention.

Preferably, said battery is a zinc-air electrode vehicle battery, although the present safety feature could also be used with other metal-air electric vehicle batteries as well.

As will be realized, a preferred means for achieving the cut-off of the blower, as well as the electrical isolation of motor and battery in the vehicle, is by use of a shock-switch responsive to the high-G conditions accompanying a collision. The blower disconnection system could be in the form of a stand-alone device, or can be activated by another collision-sensitive device within the vehicle, for example, the air bags. Typical shock-switches are accelerometers with the biaxial system (i.e., activation via two perpendicular horizontal axes), which are of particular relevance for vehicular applications, a representative manufacturer being Entran Devices of Fairfield, N.J. U.S.A.

A further preferred activation means to achieve cut-off is an inertial switch, known per se.

In a preferred embodiment of the present invention, the shock or inertial switch, as well as electrically isolating the electric vehicle motor from the battery and turning off the air blower thereto, would also activate a purging stream of inert gas that would flow into the battery stack, assisting in denuding the stack of remaining air, and maintaining an inert environment within the stack for a period of time following the collision. This feature would further eliminate hazard conditions in the battery stack by maintaining, for a given time, very low stack voltage (minimizing possible electrocution danger) and a non-reactive environment for any exposed battery components. Of course, the vehicle design must eliminate any possibility of the inert gas accumulating in the vehicle passanger compartment in the case of collision. The inert gas (e.g., nitrogen, argon or carbon dioxide) is preferably maintained under pressure in a small cylinder or capsule mounted near or within the battery, only to be released, for example, by shock-switch or inertial switch activation of a solenoid valve in the case of a collision.

As an alternative to inert gas, an inert foam, preferably with fire-retardant characteristics, could be used to block off air access to the battery air electrode spaces. A typical inert foam utilizable in the present invention is a fire-retardant foam incorporating PVC and inert oxides, such as alumina and/or zinc borate.

The invention will now be described in connection with certain preferred embodiments with reference to the following illustrative examples and figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF PREFERRED EMBODIMENTS

EXAMPLE 1

Figure 1:
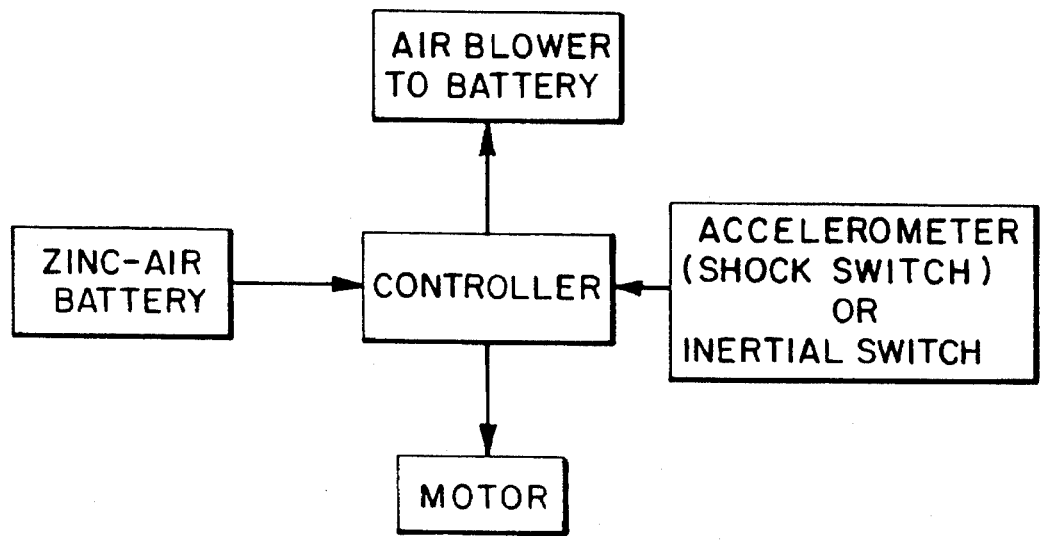
FIG. 1 is a self-explanatory schematic block diagram of an embodiment of the system of the present invention.
Figure 2:
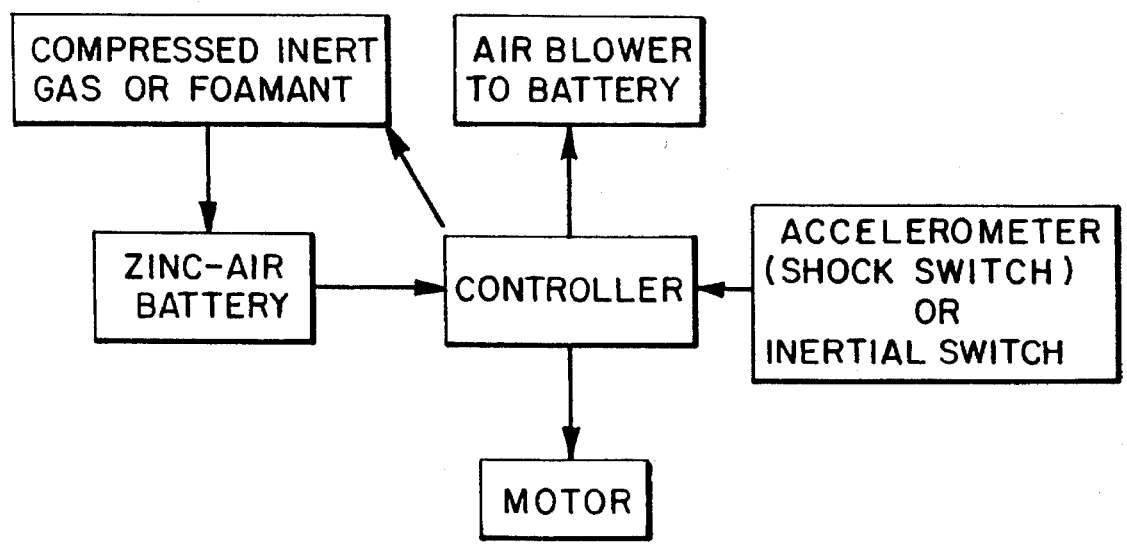
FIG. 2 is a self-explanatory schematic block diagram of an embodiment of the invention including a container for a pressurized inert gas or foam.

A first experiment was carried out to demonstrate the effect of cutting power to the air blower supplying air to a zinc-air cell. A zinc-air bicell was built comprising a central zinc anode flanked on either side by an air electrode. The zinc anode capacity was 246 Ahr to 100% depth of discharge, while the total air electrode area was 700 $cm^2$. The cell was placed in a close fitting box which allowed about 1 mm space around each air electrode, the box being supplied with air from an air blower. In one test run, the cell provided a current of 100 Amps at about 1 V under an air flow of 10 liters per minute into a resistance load of 0.01 ohms. At a prearranged time representing a collision actuated signal, the current to the blower was cut, and the voltage and current output from the zinc-air cell followed as a function of time. Within 5 seconds the cell voltage was 100 mV and the current had fallen to 10 Amps, as a result of mass transfer limitations at the air electrode, and this result gave a good prognosis for the safety of multicell battery units.

EXAMPLE 2

A second experiment was carried out to demonstrate the effect of sweeping nitrogen in place of air through the air space of a simultaneously shorted zinc cell. The zinc-air cell of Example 1 was subjected to a short at a predetermined time representing an impact actuated signal, while simultaneously cutting power to the air blower and sweeping the air space with nitrogen from a cylinder opened using a solenoid valve. The short was across a milliohm shunt and the nitrogen sweep rate in the cell air spaces was 20 liters per minute. Within 5 seconds the cell voltage had dropped to a very low level of 30 millivolts, and the current had dropped to 3A.

EXAMPLE 3

A battery module of 66 zinc-air cells in series of the cell type described in Example 1 was supplied with air at 370 liters per minute from an air blower fitted with an accelerometer shock switch sensitive to impacts above 4 G (Entran Devices, New Jersey). The switch was set to interrupt the current to the air blower for impacts above 4 G. The module provided 76 V at 56 A through a load of 4.25 kW. The module blower and load assembly was subjected to a 5 G impact and the blower immediately disconnected, whereupon the battery output fell within 5 seconds to about 4 V at 3 Amps, giving acceptably safe voltage and current levels.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A metal-air battery-powered electric vehicle, comprising:

an electric motor;

a battery including a plurality of metal-air cells, said battery powering said motor in operation of said vehicle;

a blower system for continuously providing air to said battery cells during operation of said vehicle;

a power source for energizing said blower during operation of said vehicle;

a collision-activated switch for disconnecting said blower system from said power source, activation of said switch causing rapid depletion by said cells of air in said cells, said battery being rendered substantially inert upon said depletion.

2. A metal-air battery-powered electric vehicle according to claim 1, wherein said battery is a zinc-air electric vehicle battery.

3. A metal-air battery-powered electric vehicle according to claim 1, wherein said switch is an accelerometer with a biaxial activation system.

4. A metal-air battery-powered electric vehicle according to claim 1, wherein said switch is an inertial switch.

5. A metal-air battery-powered electric vehicle according to claim 1, wherein said switch is operatively linked to a collision-sensitive air bag release mechanism.

6. A metal-air battery-powered electric vehicle according to claim 1, wherein said switch, upon activation, also disconnects said battery from said motor.

7. A metal-air battery-powered electric vehicle according to claim 1, further comprising a source of inert gas and means for directing a stream of said gas to said cells upon activation of said switch.

8. A metal-air battery-powered electric vehicle according to claim 7, wherein said gas is selected from the group consisting of nitrogen, argon and carbon dioxide.

9. A metal-air battery-powered electric vehicle according to claim 7, wherein said gas is stored in a storage cylinder under pressure and released into the cells in case of collision by the activation of a solenoid valve which is activated by said switch.

10. A metal-air battery-powered electric vehicle according to claim 1, further comprising a source of fire-retardant foam and means for directing a stream of said foam to said cells in order to restrict air access thereto upon activation of said switch.

* * * * *